(No Model.)
W. E. SHIELDS.
CLOTHES DRIER.
No. 604,428. Patented May 24, 1898.
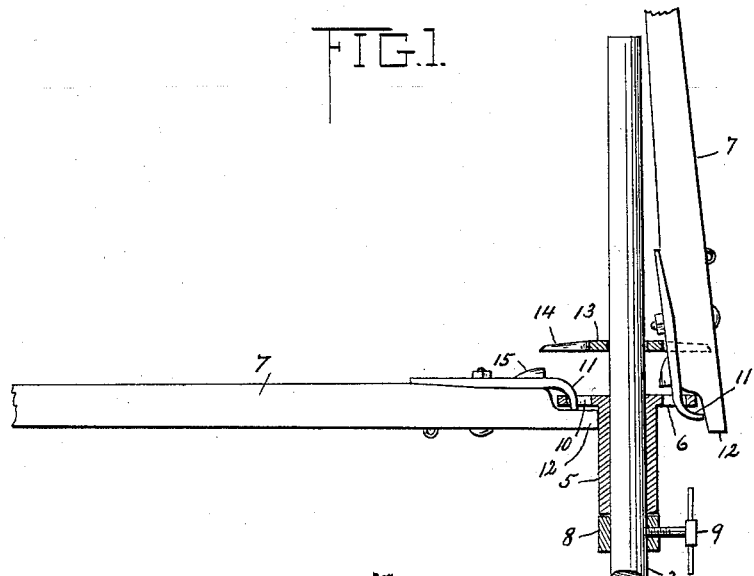
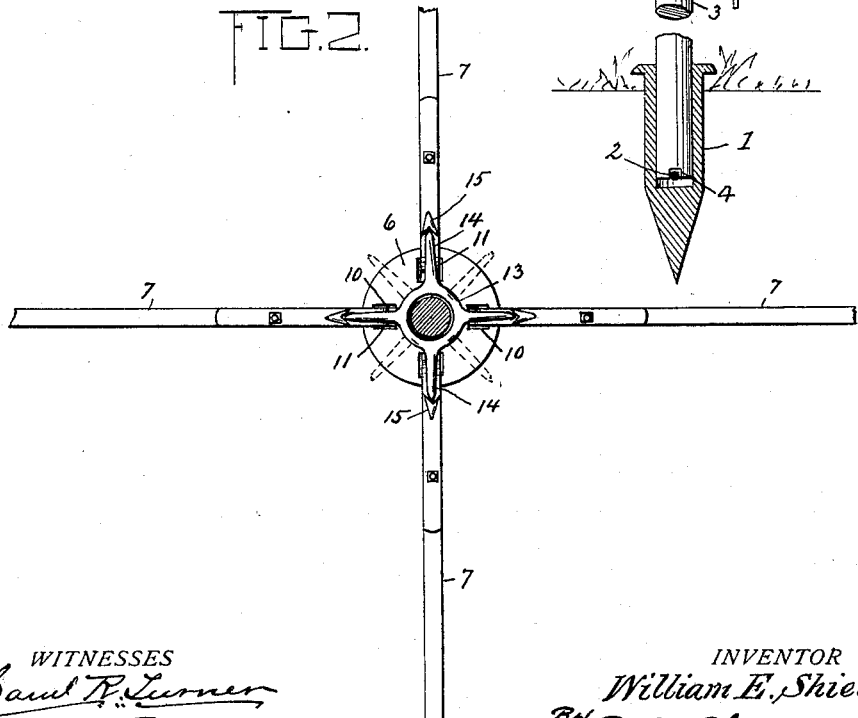
WITNESSES
INVENTOR
William E. Shields:
By John Hedderburn
Attorney

UNITED STATES PATENT OFFICE.

WILLIAM E. SHIELDS, OF NASHVILLE, MICHIGAN, ASSIGNOR TO WELLS T. BARKER AND LEN W. FEIGHNER, OF SAME PLACE.

CLOTHES-DRIER.

SPECIFICATION forming part of Letters Patent No. 604,428, dated May 24, 1898.

Application filed February 20, 1897. Serial No. 624,390. (No model.)

*To all whom it may concern:*

Be it known that I, WILLIAM E. SHIELDS, a citizen of the United States, residing at Nashville, in the county of Barry and State of Michigan, have invented certain new and useful Improvements in Clothes-Driers; and I do hereby declare the following to be a full, clear, and exact description of the invention, such as will enable others skilled in the art to which it appertains to make and use the same.

The invention relates to improvements in clothes-driers.

The object of the present invention is to improve the construction of clothes-driers and to provide a simple, strong, and durable one adapted to be compactly folded when not in use and capable of having its arms locked when in horizontal position to prevent them from being accidentally swung upward.

The invention consists in the construction and novel combination and arrangement of parts hereinafter fully described, illustrated in the accompanying drawings, and pointed out in the claims hereto appended.

In the drawings, Figure 1 is a central vertical sectional view of a clothes-drier constructed in accordance with this invention and showing one arm folded and the opposite arm arranged in a horizontal position for use. Fig. 2 is a plan view.

Like numerals of reference designate corresponding parts in both figures of the drawings.

1 designates a cylindrical socket having a tapering or pointed lower end and adapted to be readily driven into the ground. The socket 1, which is provided near the lower end of its opening with a cross-piece or pin 2, is adapted to receive the lower end of a stem or standard 3, which fits snugly within the socket and is provided at its lower end with a notch 4 to engage the pin 2. By this construction the stem or standard is firmly supported in an upright position and is detachably interlocked with the socket, so that it may be readily removed when not in use.

On the stem or standard 3 is arranged a vertically-adjustable sliding sleeve 5, provided at its upper end with a horizontal flange 6, to which clothes-supporting arms 7 are connected. The sleeve is secured at any desired adjustment upon the stem or standard by a collar 8, which is provided with a set-screw 9, adapted to engage the stem or standard.

The inner ends 12 of the arms 7 are recessed at their upper edges and have secured to them hooks 11, which project beyond the shoulders formed by the recesses to form eyes for engaging openings 10 of the flange 6. The hooks are bolted to the drier-arms and operated to hinge the same to the sliding sleeve 5, and when the said drier-arms are arranged in a horizontal position for use their inner ends 12 abut against the sliding sleeve and form stops to limit the downward swing of the arms.

The clothes-supporting arms are locked in a horizontal position by a horizontal plate 13, provided with a central circular opening to receive the stem or standard 3 and arranged above the sliding sleeve 5. The locking-plate is provided with fingers 14, adapted to engage shoulders 15 of the arms 7, such shoulders being preferably formed on the hooks and consisting of enlargements or bosses provided at their inner ends with V-shaped recesses to receive the ends of the fingers. When it is desired to swing the arms upward for folding the clothes-drier, the locking-plate 13, which is held in engagement by gravity, is lifted out of engagement with the shoulders 15 and partially rotated to bring the fingers over the intervals between the arms.

The invention has the following advantages: The clothes-drier is simple and comparatively inexpensive in construction, it is easily arranged in position for use, and it is capable of being compactly folded when not in use. The locking-plate forms an efficient device for retaining the drier-arms in a horizontal position, and it is readily manipulated to disengage its fingers from the shoulders of the arms, so that the latter may be folded upward against the stem or standard.

Changes in the form, proportion, and minor details of construction may be resorted to without departing from the spirit or sacrificing any of the advantages of the invention.

What I claim is—

1. In a clothes-drier, the combination of a stem or standard, drier-arms horizontally connected with the same, and adapted to swing upward in folding, and a locking-plate mounted on the stem or standard at a point above the hinged ends of the arms and provided with fingers engaging said arms and locking the same in a horizontal position, said locking-plate being held in engagement with the arms by gravity and adapted to be rotated partially to bring its fingers opposite the intervals between the arms to permit the latter to swing upward, substantially as described.

2. In a clothes-drier, the combination of a stem or standard, an adjustable sleeve mounted thereon and provided with a flange having openings, drier-arms provided at their inner ends with recesses, hooks secured to the drier-arms and projecting over the recessed portions thereof and linked into the openings of the flange, said hooks being provided with shoulders, and a locking-plate arranged on the stem or standard above the sleeve and provided with fingers engaging said shoulders to lock the drier-arms in a horizontal position, said locking-plate being adapted to be partially rotated to bring its fingers opposite the intervals between the arms for permitting the same to swing upward, substantially as described.

In testimony whereof I have signed this specification in the presence of two subscribing witnesses.

WILLIAM E. SHIELDS.

Witnesses:
V. R. MARTIN,
F. M. WEBER.